April 29, 1969     F. GROSS     3,441,292

PIPEFITTING

Filed May 2, 1966

INVENTOR
FRIEDRICH GROSS

BY Ralph W. McIntire Jr.
ATTORNEY

United States Patent Office 3,441,292
Patented Apr. 29, 1969

1

3,441,292
PIPEFITTING
Fredrich Gross, Bergfeld, Germany, assignor to Westinghouse-Bremsen- und Apparatebau G.m.b.H., Hannover, Germany
Filed May 2, 1966, Ser. No. 546,861
Claims priority, application Germany, June 8, 1965, W 39,304
Int. Cl. F16d 1/00
U.S. Cl. 285—39                                4 Claims

ABSTRACT OF THE DISCLOSURE

A union fitting having left-hand threads on one end and right-hand threads on the other end is screwed into a pair of pipes to be joined by means of polygonal collar of predetermined axial width fixed to said fitting and axially movable within a hole of conforming contour in an outer polygonal ring member, having an axial width greater than the collar width, interposed between the pipe ends.

---

A mechanically secured connection between two assembly parts which are connected together by means of a union fitting only, becomes effective whenever both of the assembly parts are secured solidly to each other by means of the screw tightening. With union fittings of the conventional type this cannot be attained in that they are equipped with a hexagonal connection between the right-hand thread and the left-hand thread and against these flanks both of the two assembly parts are pressed. Since, however, the thread chasing of the male and female threads cannot possibly be so established that both parts come in contact against the collar flanges exactly in positive connection, the conventional type union fittings cannot be utilized for the aforementioned purpose.

The invention establishes as its purpose the presentation of a union fitting which eliminates this difficulty and also connects assembly parts, which carry fluid mediums, such as pipes, housing passages and similar parts in a mechanically solid securement as well as a sealed connection. In addition, it is to be attained that the assembly parts that are connected in this manner can be rotated around a thread axis so that also, for example, a pipe elbow can be solidly secured in a leakproof manner in conventional swing positions.

The solution of this purpose in accordance with the conditions of the invention is possible therewith in that the union fitting is equipped with a collar of definite thickness that engages in a female ring of greater thickness against this in a non-rotatable manner but, however, in an axially displaceable manner, and that the flanges of the female ring form the projection rest for the parts which are to be screwed together. Additional designs will be hereinafter described.

Figure 1:
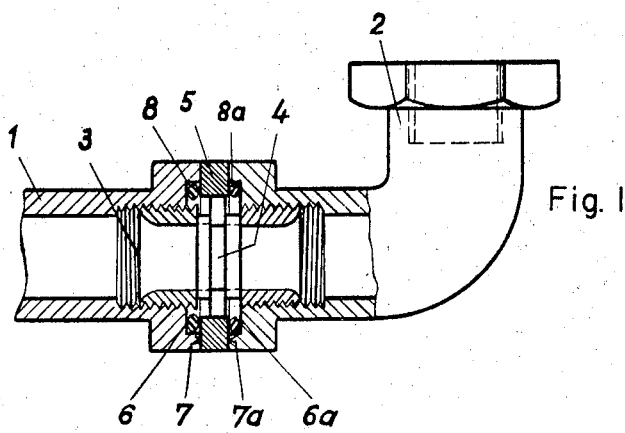
Figures 2, 3:
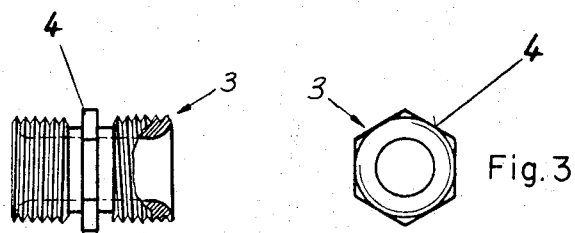
Figures 4, 5:
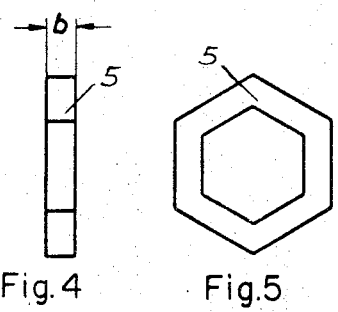
Figures 6, 7:
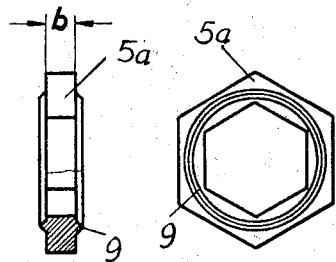

A typical design is illustrated on the drawing in which:
FIG. 1 is a side elevational view, taken partly in section, of a pipefitting connecting a pipe to a pipe elbow;
FIG. 2 is a side elevational view of a portion of the pipefitting of FIG. 1;
FIG. 3 is an end elevational view of the pipefitting of FIG. 2;
FIG. 4 is a side elevational view of the ring member on the pipefitting as shown in FIG. 1;
FIG. 5 is an end elevational view of the ring member of FIG. 4;
FIG. 6 is a side elevational view of a modification of the ring member of FIGS. 4 and 5; and
FIG. 7 is an end elevational view of the ring member of FIG. 6.

2

Referring to the drawing, a piping end generally indicated at 1 in the FIGURE 1, is secured in accordance with the invention to a pipe elbow 2 by a union fitting in a solid securement and in a sealed manner. For this purpose, there is provided the smaller diameter of either the pipe 1 or the elbow 2 with a left-hand thread and the other with a right-hand thread. The union fitting 3 which, in this example, is constructed as a through flow bushing for the fluid medium, as illustrated in the side view of FIGURE 2 and the face view of FIGURE 3. It is securely connected with a hexagonal collar 4 which has a thickness $a$, shown in FIG. 2, and carries on one end externally disposed left-hand threads and on the other end externally disposed right-hand threads. The female ring 5 that is illustrated in the FIGURES 4 and 5 is constructed on the inside and the outside in a hexagonal manner. The hexagonal collar 4 of the union fitting can be displaced with clearance in the inner hexagon. The thickness $b$, as shown in FIG. 4 of the female ring is larger than the thickness $a$ of the hexagonal collar 4. Both of the parts 1 and 2 that are to be joined together include cavities 6 and 6a, respectively, and also ring flats 7, and 7a, respectively, in the ends that are to be joined together. The sealing rings 8 and 8a are arranged in the cavities 6 and 6a, respectively.

Before the parts are joined together, the sealing rings 8 and 8a are positioned in the cavities 6 and 6a, respectively. The female ring 5 is shoved over the hexagonal collar 4 so that whenever the female ring is rotated to rotate therewith the union fitting 3, their threads engage in the threads of the assembly parts. When it is pulled securely in place, then the ring flats 7 and 7a, and also the sealing rings 8 and 8a butt the flanges of the female ring. The connection is therewith mechanically secure and also sealed. During the beginning of the screwing together of the assembly, the one thread end of the union fitting fastens sooner than the other against its counter thread so that the hexagonal collar 4 never is positioned middlewise to the ring flats 7 and 7a, respectively. In accordance with the conditions of the invention, this has merely the consequence that the hexagonal collar 4 is displaced inside the thickness $b$ of the female ring in an axially offcenter manner.

The positioning of the ring flats 7 and 7a, respectively, on the flanges of the female ring remains insured regardless. This arrangement provides the additional advantage in that the location of the assembly parts to each other can be altered by the means of a rotation around the thread axis. As an example, the pipe elbow 2 can be rotated in either direction and then be pulled securely together by means of the female ring 5.

The sealing of the parts to be joined in accordance with the union fitting of the conditions in accordance with the invention can also be accomplished by means of circular metallic sealing rings 9 that are provided on the flanges of the female ring 5a (FIGURES 6 and 7). These are pressed, during the clamping operation of the union fitting, against the ring flats 7 and 7a respectively. With this design, the cavities 6 and 6a, respectively, and also the elastic sealing rings 8 and 8a are eliminated. The material of the metallic sealing ring 9 must hereby be of greater hardness than that of the ring flats 7 and 7a, respectively.

For the case that the assembly parts that are to be screwed together must be connected exactly parallel, the ring flats 7 as well as 7a as well as also the flanges of the female ring, respectively, can be ground correspondingly without difficulty. The latter is, for example, especially desirable whenever blocks of the hydraulic control devices are to be clamped together mechanically secure and the corresponding fluid carrying canals must be sealed.

If a mechanically secure connection is to be made without any flow-through of the fluid medium but with the possibility that the location of the assembly parts are to be established to each other in an alterable manner, then the union fitting can be designed without lengthy passage borings and the sealing rings 8 and 8a, respectively, can be eliminated.

Having now described the invention, what I claim as new and desire to secure by Letters Patent is:

1. A conduit coupling, comprising:
    (a) a tubular body having opposite end portions,
    (b) said pair of end portions having threads externally disposed thereon, the threads on one of said ends being directed oppositely to the threads on the other of said ends,
    (c) a collar fixedly disposed on said body intermediate said ends, said collar having a predetermined width axially of said ends,
    (d) a ring member coaxially disposed on said collar for axial movement relative to said collar and having a width axially of said cylindrical body greater than said predetermined width of said collar,
    (e) the outer periphery of said collar and the inner periphery of said ring having a mutually cooperating configuration to prevent relative rotational movement therebetween,
    (f) the opposite sides of said ring member defining said width extending transversely of the axis of said cylinder, a first annular portion of each side serving as a seat for directly engaging the end of a corresponding one of two conduits to be threaded on the opposite ends of the tubular body, and
    (g) seal means for effecting a seal between a second annular portion of each of said opposite sides and the corresponding one of said pair of conduits when said first annular portions are directly engaged with the ends of said conduits.

2. A conduit coupling, as recited in claim 1, in which the outside diameter of said threads on one end are the same as that of said threads on the other of said ends.

3. A conduit coupling, as recited in claim 1, in which;
    (a) said first annular portion of each said opposite sides comprises the outer peripheral portion thereof;
    (b) said second annular portion of each said opposite sides of said ring comprises the inner peripheral portion of said ring; and
    (c) said annular seal means each having an outside diameter less than the outside diameter of said ring member and greater than the inside diameter of said ring member and having a cross-sectional diameter greater than the depth of a counterbore in the end of each conduit, each said sealing means being compressible between the bottom of a corresponding counterbore and the second annular portion of the corresponding side of said ring member.

4. A pipefitting as recited in claim 1, in combination with said pair of conduits,
    (a) said pair of conduits each having a threaded axial bore therein threadly receiving one of said pair of end portions, the end of each of said pair of members abutting said first annular portion of one of said opposite sides of said ring member;
    (b) an axial counterbore in the end of each of said pair of members forming a shoulder between said bore and said counterbore, said counterbore being of larger diameter than the inner diameter of said ring member;
    (c) each annular sealing ring disposed in each counterbore, said sealing member having an outer diameter greater than the inner diameter of said ring member, each sealing ring being axially compressed between said shoulder and the corresponding one of said second annular portions of said opposite sides of said ring member.

References Cited

UNITED STATES PATENTS

| 1,128,997 | 2/1915 | Morden | 285—39 |
| 1,167,391 | 1/1916 | Elger | 285—39 |
| 2,258,066 | 10/1941 | Oyen | 285—334 |
| 2,793,830 | 5/1957 | Nakaji et al. | 285—212 |
| 3,227,380 | 1/1966 | Pinkston | 285—175 |

FOREIGN PATENTS

| 534,908 | 3/1941 | Great Britain. |
| 1,085,339 | 7/1954 | France. |

CARL W. TOMLIN, *Primary Examiner.*

W. L. SHEDD, *Assistant Examiner.*

U.S. Cl. X.R.

285—175, 355, 349